UNITED STATES PATENT OFFICE.

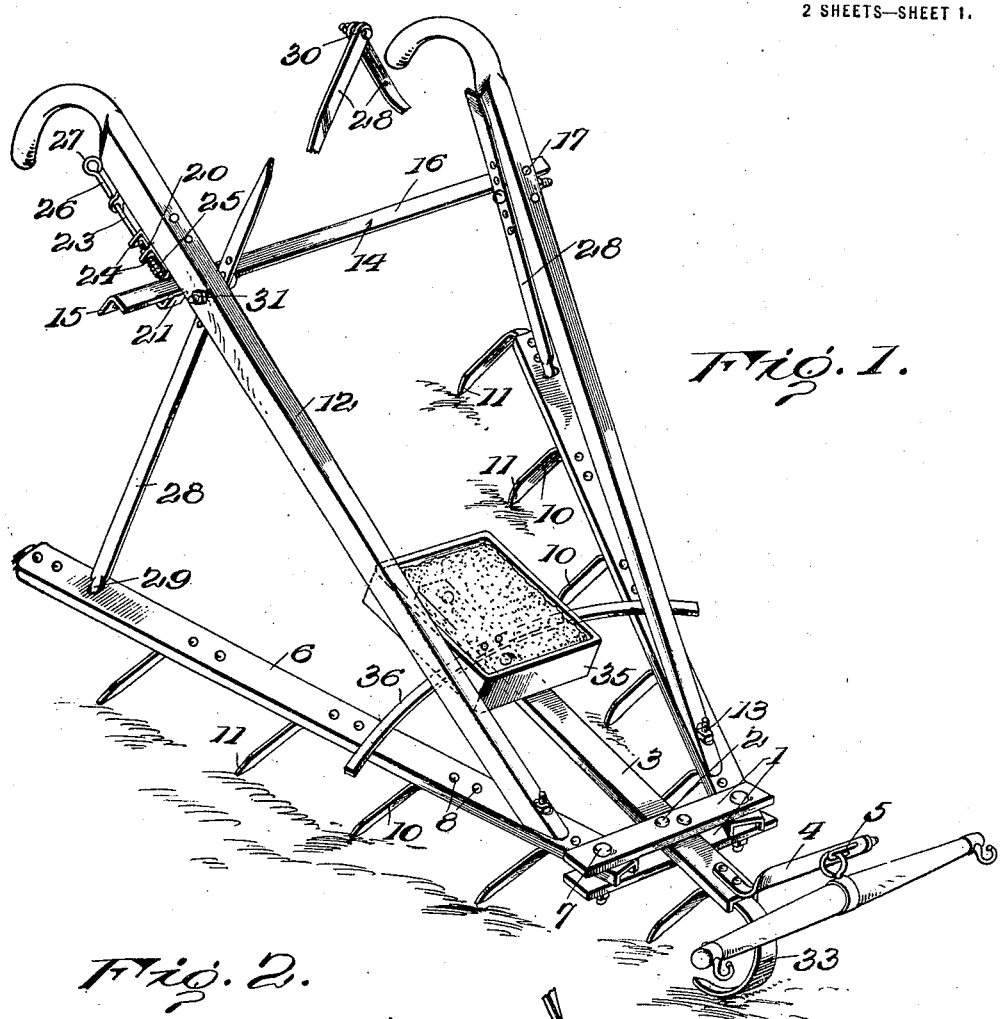

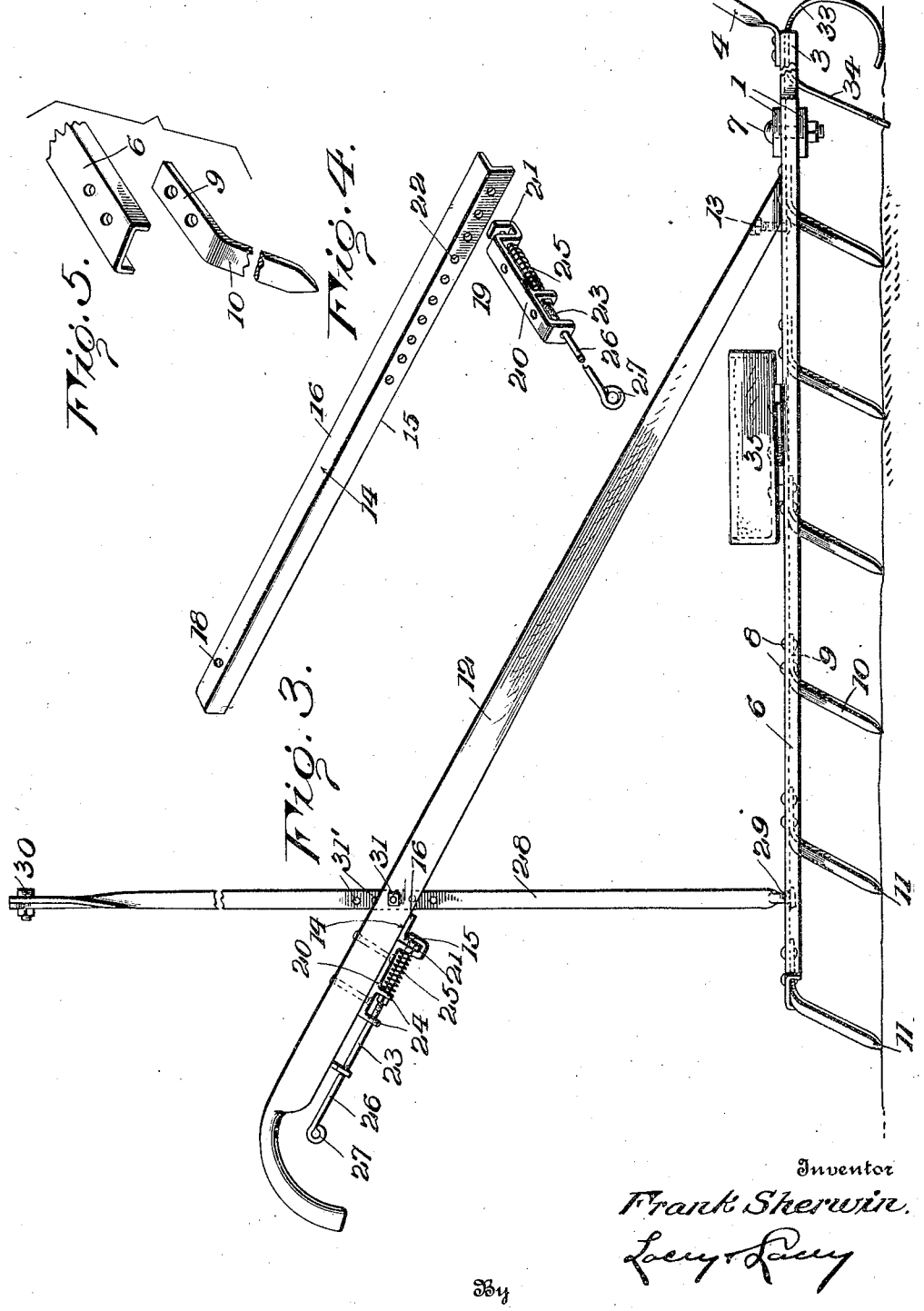

FRANK SHERWIN, OF BROOKINGS, SOUTH DAKOTA.

AGRICULTURAL IMPLEMENT.

1,341,724.   Specification of Letters Patent.   Patented June 1, 1920.

Application filed October 8, 1918. Serial No. 257,367.

*To all whom it may concern:*

Be it known that I, FRANK SHERWIN, a citizen of the United States, residing at Brookings, in the county of Brookings and State of South Dakota, have invented certain new and useful Improvements in Agricultural Implements, of which the following is a specification.

This invention has as its object to provide an agricultural implement in the form of a cultivator, the implement being of the general walking horse-drawn type.

The implement embodying the present invention includes beams which carry the cultivator teeth and which beams are connected for relative angular adjustment so that the effective width of the implement may be increased or decreased as desired by the one using the same and it is one object of the invention to provide novel means whereby the said beams may be relatively adjusted in a convenient manner without the necessity of bringing the implement to a standstill.

Another object of the invention is to provide means connected with the beams for equalizing the angular adjustment thereof so that when the handles connected to the beams are spread apart or drawn toward each other, the beams will be correspondingly swung, or in other words, will be swung through the same number of degrees of angular adjustment.

A further object of the invention is to provide a novel form of tooth which will be adapted to serve not only as a cultivator tooth and weeder, but also as a means for packing the subsoil to properly prepare the same for the planting of seed.

In the accompanying drawings:

Figure 1 is a perspective view of the implement embodying the present invention;

Fig. 2 is a vertical transverse sectional view therethrough, looking in a rearward direction;

Fig. 3 is a side elevation of the implement;

Fig. 4 is a perspective view of the width adjusting device;

Fig. 5 is a perspective view illustrating the rear end of one of the beams and one of the teeth separated therefrom.

The cultivator beams of the implement are pivotally connected at their forward ends with a draft device which comprises spaced upper and lower plates indicated by the numeral 1 between which plates there is riveted or otherwise secured as at 2, the rear end of a short draft bar 3. An arm 4 extends upwardly and forwardly from the forward end of the draft bar 3 and is provided with any suitable means, indicated at 5, for the connection therewith of a swingle tree. The cultivator beams which are indicated by the numeral 6, may be of channel iron construction or of any other suitable form or construction, and the said beams at their forward ends are disposed between the spaced ends of the plates 1 and connected thereto by means of pivot bolts 7, the connection providing, of course, for relative angular adjustment of the said beams 6 so that the cultivator teeth carried thereby may be caused to travel through the soil along a wider or narrower path as may be desired. In the present instance the beams 6 are of channel iron construction and are disposed with their channel sides presented downwardly, and the cultivator teeth, one of which is most clearly shown in Fig. 5 of the drawings, are secured by means of rivets or the like, indicated by the numeral 8, to the under sides of the beams. The bolts or rivets 8 pass through openings formed in a flat shank 9 which is provided at the upper end of the tooth and is received within the channel of the respective beams 6. The body of each tooth is indicated by the numeral 10 and the same is flat and relatively broad except at its end where it is tapered to a sharp point, as indicated by the numeral 11. As will be observed by reference to Figs. 1 and 3 of the drawings, the cultivator teeth are so arranged that their bodies 10 will extend downwardly and rearwardly at such an angle that while the teeth serve to cultivate and weed the upper layer of soil they also serve to press or compact the soil immediately below said upper layer of soil.

In order that the beams 6 may be conveniently relatively angularly adjusted while the implement is being drawn over the field, handles 12 closely resembling plow handles, are secured at their lower ends by bolts 13 to the upper sides of the beams 6 at the forward ends of the latter, the handles being inclined upwardly and rearwardly above the beams from their point of attachment thereto. The lower ends of the handles 12 are preferably transversely rounded or convex so that the handles may have but slight rocking motion upon the securing bolts 13 when the handles are adjusted toward and from each other for the purpose of adjusting the beams which support the teeth of the implement.

As heretofore stated means is provided for holding the handles 12 in positions of angular adjustment so that when the handles have been adjusted to spread the beams or bring them closer together, the parts will be held rigidly in the positions to which they have been adjusted. The means above mentioned includes a spacing bar 14 which is preferably of angle iron construction, including a depending wing 15 and a wing 16 extending at right angles thereto. A pivot bolt 17 is fitted through the left-hand one of the handles 12 and through an opening 18 formed in the wing 16 of the spacing bar 14, this opening being located near one end of the said bar. A guide member 19 includes an attaching portion 20 which is bolted or otherwise secured to the under side of the right-hand handle 12, and the said guide member is provided with a hooked forward end 21, the wing 16 of the spacing bar 14 resting slidably in the said end 21 as shown in Figs. 1 and 3. Near its free end the wing 15 of the bar 14 is formed with a series of openings 22, the series extending longitudinally thereof, and a latch bolt 23 mounted in a guide lug 24 upon the under side of the attaching portion of the guide member 19, is designed to have its end projected into the openings 22 selectively so as to lock the bar with relation to the said right-hand handle. A spring 25 is provided upon the bolt for normally holding the same projected forwardly, and the bolt is extended rearwardly as at 26 and terminates in a finger ring 27 in which the forefinger of the right-hand may be engaged while the hand is still grasping the said handle 12, the operator of the implement being thus permitted to retract the bolt 23 whenever desired and to spread the cultivator beams or swing the same toward each other without arresting the progress of the implement.

The means provided for equalizing the adjustment of the cultivator beams comprises a pair of bars 28 which are pivotally connected in any suitable manner at their lower ends as at 29 with the respective beams 6 adjacent the rear ends of the said beams. These bars extend upwardly along converging lines and at their upper ends are mutually pivoted, as indicated by the numeral 30. At their points of intersection with the handles 12, the bars are secured to the respective handles by means of suitable bolts 31, or any other suitable type of fastening means may be employed for the purpose, the bars being held against the inwardly presented sides of the handles 12. Due to the provision of the equalizing bars 28, it will be understood that when the handles 12 are swung apart or toward each other in adjusting the effective width of the implement, the said handles and, of course, the beams, will be moved through corresponding arcs at the opposite sides of the vertical front to rear median line of the implement as a whole.

In order that the forward end of the implement may be supported for travel over the ground surface and in order that the implement may be more readily turned at the end of a row, there is preferably provided a runner which is indicated in general by the numeral 33 and which is in the nature of a suitable length of bar metal bent to approximately semi-circular form and shown most clearly in Figs. 1 and 3 of the drawings, the upper portion of this runner being bolted or otherwise secured within the channel of the forward end of the draft beam 3 by bolts or other suitable securing devices and the lower portion or end of the runner being curved rearwardly so as to ride over the ground surface. Formed either integral with the portion of the runner which is secured to the draft beam 3 or separate therefrom and independently secured in place, is a tooth 34 which corresponds in its general form and in its function to the teeth 10 heretofore described.

The draft beam 3 is extended rearwardly between the beams 6 and mounted upon the beam at its rear portion is a weight box 35 in which may be placed sand, rocks, or other material for the purpose of weighting the rear end of the said draft beam 3. In order that this weight may be imposed upon the beams 6 so as to cause the teeth carried by these latter beams to enter the soil the proper depth, an arcuate bearing member 36 is secured to the under side of the beam 3 beneath the box 35 and the end portions of this bearing member extend over and rest upon the upper side of said beams 6, it being understood that the weight is at all times imposed upon the beams 6 regardless of their relative adjustment as the said beams may move slidably beneath the said bearing member 36.

It is preferable that the bars 28 be provided with a series of openings 31' to interchangeably receive the bolts 31 so that the handles 12 may be adjusted so as to vary the height of their rear or grip ends.

Having thus described the invention, what is claimed as new is:

1. In an implement of the class described, relatively angularly adjustable beams, handles connected to the beams and adjustable therewith, and bars mutually pivoted at their upper ends and connected each to one of the beams and the respective handle to equalize angular adjustment of the beams.

2. In an implement of the class described, relatively angularly adjustable beams, handles connected to the beams and adjustable therewith, and bars mutually pivoted at their upper ends and connected each to one of the beams and fulcrumed at an intermediate point upon the respective handle to equalize angular adjustment of the beams.

3. In an implement of the class described, relatively angularly adjustable beams, handles connected to the beams and adjustable therewith, a spacer bar pivotally connected with one of the handles and slidably supported by the other handle, a locking means carried by the last-mentioned handle for coaction with the said spacer bar, and bars manually pivoted at their upper ends and connected each to one of the beams and the respective handles to equalize angular adjustment of the beams.

4. In a cultivator having tooth carrying beams, means mounting said beams at the forward end for opening and closing movement with respect to each other, a handle carried by each beam, means connecting said handles for opening and closing movement corresponding to the movement of said beams, and converging members, one connected with each beam and its respective handle and manually connected at the top to equalize the opening and closing movement of the beams and handles with respect to the vertical medial plane of the cultivator.

In testimony whereof I affix my signature.

FRANK SHERWIN. [L. S.]